(12) United States Patent
Haruta et al.

(10) Patent No.: US 8,206,797 B2
(45) Date of Patent: Jun. 26, 2012

(54) LABEL

(75) Inventors: Masayuki Haruta, Inuyama (JP);
Masatoshi Hashimoto, Inuyama (JP);
Masakazu Iwasaki, Inuyama (JP);
Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 42 days.

(21) Appl. No.: 12/747,103

(22) PCT Filed: Dec. 11, 2008

(86) PCT No.: PCT/JP2008/072476
§ 371 (c)(1),
(2), (4) Date: Jun. 9, 2010

(87) PCT Pub. No.: WO2009/075312
PCT Pub. Date: Jun. 18, 2009

(65) Prior Publication Data
US 2010/0260951 A1    Oct. 14, 2010

(30) Foreign Application Priority Data

Dec. 13, 2007  (JP) ................................ 2007-321743
Feb. 28, 2008  (JP) ................................ 2008-047442

(51) Int. Cl.
*B65B 53/00*  (2006.01)
(52) U.S. Cl. ...................... 428/35.1; 428/34.9; 428/40.1; 283/81
(58) Field of Classification Search .................. 428/35.1, 428/34.9, 910, 98, 440, 480, 40.1; 283/81
See application file for complete search history.

(56) References Cited

U.S. PATENT DOCUMENTS

| | | | | |
|---|---|---|---|---|
| 5,985,387 A * | 11/1999 | Mori et al. | ................ | 428/34.9 |
| 6,447,925 B1 * | 9/2002 | Tabota et al. | ................ | 428/480 |
| 7,829,655 B2 * | 11/2010 | Endo et al. | ................ | 528/308.1 |
| 2010/0260951 A1 * | 10/2010 | Haruta et al. | ................ | 428/35.1 |
| 2011/0008607 A1 * | 1/2011 | Haruta et al. | ............... | 428/304.4 |

FOREIGN PATENT DOCUMENTS

| | | |
|---|---|---|
| JP | 09-001751 A | 1/1997 |
| JP | 2002-120343 A | 4/2002 |
| JP | 2002-363312 A | 12/2002 |
| JP | 2005-194466 A | 7/2005 |
| JP | 2006-045317 A | 2/2006 |
| JP | 2008-274160 A | 11/2008 |

OTHER PUBLICATIONS

European Patent Office, Extended European Search Report in European Patent Application No. 08860074.7 (Jan. 6, 2012).
Japanese Patent Office, Notification of Reasons for Refusal in Japanese Patent Application No. 2008-047442 (Feb. 28, 2012) English translation.
Chinese Patent Office, First Office Action in Chinese Patent Application No. 200880120189.0 (Mar. 12, 2012) Partial English translation.

\* cited by examiner

Primary Examiner — N. Edwards
(74) Attorney, Agent, or Firm — Leydig, Voit & Mayer, Ltd.

(57) ABSTRACT

A heat-shrinkable polyester film is obtained which is extremely satisfactory in openability along a perforation, has exceedingly high productivity, and is less apt to split in the lengthwise direction in processing, e.g., printing. Provided is a label which is formed from the heat-shrinkable film and is satisfactorily tearable. The label is one formed from a tubular material which comprises as a base a heat-shrinkable film thermally shrinking mainly in the film width direction and which has been cut according to an object to be packaged, both edges in the film width direction having been bonded to each other. The tubular material has been thermally shrunk to constitute the label, with which at least part of the periphery of the object to be packaged is covered. The label has an angle tear strength in the direction perpendicular to the main shrinkage direction (i.e., in the film length direction) of 100-310 N/mm and a tensile break strength in the direction perpendicular to the main shrinkage direction (i.e., in the film length direction) of 50-300 MPa.

6 Claims, 1 Drawing Sheet

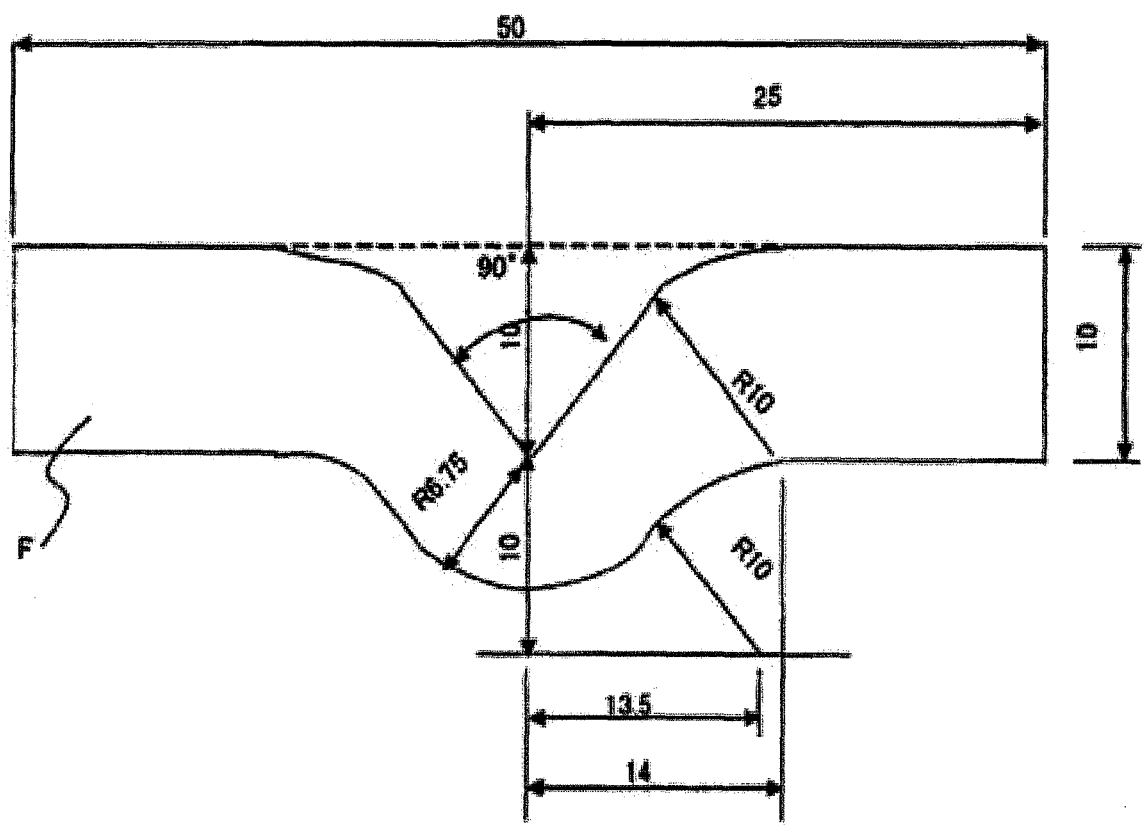

LABEL

TECHNICAL FIELD

The present invention relates to a label formed by a heat-shrinkable film, and specifically it relates to a label which is composed of a heat-shrinkable film covered and is satisfactorily tearable.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyester resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

However, regarding the conventional heat-shrinkable polyester film, since almost no drawing is carried out in the longitudinal direction orthogonal to the main shrinkage direction, the mechanical strength is low, in the case where it is shrunk and covered on a PET bottle or the like as a label, there is a defect that a label cannot be torn well along perforations (namely, poor perforation-tear property). Further, when a film is drawn in the longitudinal direction in production in order to improve perforation-tear property of the heat-shrinkable polyester film, the mechanical strength becomes high, and perforation-tear property are improved to some extent, however, shrinkage force is exhibited in the longitudinal direction, thus when it is shrunk and covered on a PET bottle or the like as a label, a defect in which visual quality (shrinkage finish properties) becomes very bad is exposed. Since the conventional heat-shrinkable polyester film is hardly drawn in the longitudinal direction orthogonal to the main shrinkage direction, there is a problem that the mechanical strength thereof is low and the film tends to split in the longitudinal direction in processing such as printing, and there is a problem that film stiffness is insufficient in high-speed attachment when a film is attached on a bottle or the like.

Therefore, in order to improve perforation-tear property of the heat-shrinkable polyester film, a method in which an incompatible thermoplastic resin is mixed in the main raw material of the heat-shrinkable polyester film is proposed (Patent document 1).

Patent document 1: Japanese Unexamined Patent Publication No. 2002-363312

DISCLOSURE OF THE INVENTION

Problem to be Solved by the Invention

According to the method in which an incompatible thermoplastic resin is mixed in the main raw material of the heat-shrinkable polyester film like the above-described Patent document 1, although the perforation-tear property of the heat-shrinkable polyester film are improved to some extent, it cannot be necessarily said to obtain a heat-shrinkable polyester film with sufficient perforation-tear property. Further, even in the case of adopting a method like the Patent document 1, since drawing can be carried out only in the width direction in production, it is not possible to produce a heat-shrinkable polyester film efficiently.

An object of the present invention is to solve the problems of the conventional heat-shrinkable polyester film, to obtain a heat-shrinkable polyester film which is extremely satisfactory in openability along a perforation, has exceedingly high productivity and hardly split in the longitudinal direction in processing such as printing, and to provide a label which includes such a heat-shrinkable film and is satisfactorily tearable.

Means for Solving the Problem

The present invention provides a label comprising a tubular body including a heat-shrinkable film as a base material thermally shrinking in the film width direction as the main shrinkage direction, being cut according to an object to be packaged and bonded at both edges in the film width direction, the tubular body being thermally shrunk so that at least part of the periphery of the object to be packaged is covered with the label, wherein a right-angle tear strength in the direction orthogonal to the main shrinkage direction (film longitudinal direction) is 100 N/mm to 310 N/mm, and a tensile break strength in the direction orthogonal to the main shrinkage direction (film longitudinal direction) is not less than 50 MPa and not more than 300 MPa.

Bonding of the aforementioned label can be conducted with an organic solvent.

The Elmendorf ratio of the aforementioned label can be not less than 0.1 and not more than 2.0 in the case that an Elmendorf tear load in the direction orthogonal to the main shrinkage direction (film longitudinal direction) and an Elmendorf tear load in the main shrinkage direction are measured.

The refractive index in the direction orthogonal to the main shrinkage direction (film longitudinal direction) of the aforementioned label can be not less than 1.565 and not more than 1.610.

The invention further allows for a perforation or a notch along the direction orthogonal to the main shrinkage direction (film longitudinal direction).

The heat-shrinkable film of the aforementioned label can be a heat-shrinkable polyester film.

The heat-shrinkable film of the present invention includes a heat-shrinkable polyester film, a heat-shrinkable polystyrene film, a heat-shrinkage polyolefin film, a heat-shrinkable polyvinylchloride film and so on. The perforation means one provided continuously with a plurality of slits in a linear line or a curved line, including one provided with only one slit. Further, the shape of the slit composing the perforation is not particularly restricted. On the other hand, the notch means cut provided in the edge of a label, and the shape thereof is not particularly restricted.

Effect of the Invention

In regard to a heat-shrinkable film used in a label of the present invention, shrinkability in the film width direction being the main shrinkage direction is high, mechanical strength in the film longitudinal direction orthogonal to the main shrinkage direction is also high, no winding-fastening occurs in a roll film produced, wrinkle is hardly generated in a film roll, and openability is good. Therefore, the heat-shrinkable polyester film can be suitably used as a label of a container such as a bottle, as well as it can be attached very efficiently on a container such as a bottle at short times, and when it is subjected to thermal shrinkage after attachment, good finish can be exhibited in such a manner that wrinkle due to thermal shrinkage and a lack of shrinkage are extremely rare. In addition, the label attached comes to exhibit a very good openability. Therefore, the label of the present invention is satisfactorily tearable, in the case that a perforation is provided in the direction orthogonal to the main shrinkage direction, the label covered can be finely split along the perforation by an appropriate force.

BEST MODE FOR CARRYING OUT THE INVENTION

A label of the present invention includes a heat-shrinkable polyester film as a base material, with which at least part of periphery is covered and the label is thermally shrunk, and as an object of a label, in addition to a PET bottle for beverage, various kinds of bottles, cans, plastic containers of candy, box lunch etc., boxes made of paper and the like can be listed (hereinafter, these are collectively called an object to be packaged). Additionally, ordinarily in the case that a label including a heat-shrinkable polyester film as a base material is thermally shrunk and the object to be packaged is covered with the film, the label is thermally shrunk by about 2 to about 15% and closely attached on the object to be packaged. Additionally, the label with which the object to be packaged is covered may be printed or not be printed, and a perforation may be provided in the direction orthogonal to the main shrinkage direction of a label.

In the case that an object to be packaged is covered with the label, there can be adopted a method that after a tubular body is formed previously for the main shrinkage direction so as to be the circumferential direction, the object to be packaged is covered with the tubular body and the tubular body is thermally shrunk, and in the case of forming such a tubular body, other than a method of bonding a heat-shrinkable film by using various types of adhesives, it is possible to utilize a method that a heat-shrinkable film is melt-bonded to adhere using a high-temperature heating element (melt-cut sealing method) and the like. Additionally, in the case that a heat-shrinkable film is subjected to melt-cut sealing, using a predetermined automatic bag-making machine (for example, RP500 manufactured by Kyoei Corporation), after a temperature and an angle of a melt-cut blade are adjusted to a predetermined condition (for example, temperature of melt-cut blade=240° C., blade angle=)70°, a method for forming a tubular body or a bag at a predetermined speed (for example, 100 pieces/min) or the like can be adopted. In addition, in the case that an object to be packaged is covered with a label, it is possible to adopt a method where the label is wound around the periphery of the object to be packaged and by melt-cut sealing of the overlapped part, the periphery of an object to be packaged is covered with the label and then the label is thermally shrunk.

On the other hand, as a heat-shrinkable film for label formation, there can be listed a heat-shrinkable film made from various types of plastics, such as a heat-shrinkable polyester film, a heat-shrinkable polystyrene film, a heat-shrinkable polyolefin film and a heat-shrinkable polyvinylchloride film, among these, using a heat-shrinkable polyester film is preferable because heat resistance of a label becomes high and solvent resistance of a label becomes good, and also a label can be easily incinerated. Hence, the following will be mainly described with regard to a heat-shrinkable polyester film.

When a label of the present invention is measured for a right-angled tear strength per unit thickness of a label covered (film base material except for a printing layer) in the direction orthogonal to the main shrinkage direction by the following method, the right-angled tear strength is preferably not less than 100 N/mm and not more than 310 N/mm. Herein, a label is shrunk by heat treatment and attached on an object to be packaged, thus the label itself does not have so large heat-shrinkable property as a label before heat shrinkage treatment, but the direction that the label has been mainly shrunk upon attaching the label is referred to as the main shrinkage direction (hereinafter, the same description regarding the label).

[Measuring Method of Right-Angled Tear Strength]

A label is sampled as a specimen with a predetermined size in accordance with JIS-K-7128. Thereafter, both edges of the specimen are held by a universal tensile tester (for example, Autograph manufactured by Shimadzu Corporation) and strength at tensile break in the direction orthogonal to the main shrinkage direction of the label is measured in a condition of 200 mm/min in tensile speed. Then, right-angled tear strength per unit thickness is calculated using the following Equation 1.

Right-angled tear strength=strength at tensile break/thickness     Equation 1

When the right-angled tear strength in the direction orthogonal to the main shrinkage direction of a label is less than 100 N/mm, a situation in which a film is easily torn by an impact such as falling during transportation is possibly caused, whereby the case is unpreferred, conversely, when the right-angled tear strength is more than 310 N/mm, it is not preferable because cutting property (easiness of tearing) become bad at an early stage of tearing a label. The lower limit value of the right-angled tear strength is preferably 120 N/mm or more, more preferably 140 N/mm or more, and furthermore preferably 160 N/mm or more. Further, the upper limit value of the right-angled tear strength is preferably 290 N/mm or less, more preferably 260 N/mm or less, and particularly preferably 270 N/mm or less.

When a label of the present invention is measured for a tensile break strength of a label covered (film base material except for a printing layer) in the film longitudinal direction by the following method, the tensile break strength is preferably not less than 50 MPa and not more than 300 MPa.

[Measuring Method of Tensile Break Strength]

A specimen of a label with a predetermined size is produced in accordance with JIS-K-7127, both edges (in the film longitudinal direction) of the specimen are held by a universal tensile tester (for example, Autograph manufactured by Shimadzu. Corporation) and a tensile test was carried out in a condition of 200 mm/min in tensile speed, strength (stress of a film base material except for a printing layer) at tensile break is calculated as tensile break strength.

When the tensile break strength in the direction orthogonal to the main shrinkage direction of a label (in the longitudinal direction of a film) is less than 50 MPa, there occurs such a defect that processing of a film by applying tension to the film in the longitudinal direction, such as printing of the film, in the formation of a label from the film may easily cause breaking of the film. The lower limit value of the tensile break strength is preferably 90 MPa or more, more preferably 130 MPa or more, and particularly preferably 160 MPa or more.

In a label of the present invention, when Elmendorf tear loads in the direction orthogonal to the main shrinkage direction and the main shrinkage direction are obtained by the following method, an Elmendorf ratio is preferably 0.1 or more and 2.0 or less.

[Measuring Method of Elmendorf Ratio]

In accordance with JIS-K-7128, a test piece is prepared by cutting a label into a rectangular shape, of which longer sides correspond to the main shrinkage direction (film width direction), and then slitting up the cut piece at the center of one of the longer sides from the end edge thereof, followed by measurement of Ehnendorf tearing road (Elmendorf tearing road of the film base material except for a printing layer) in the direction orthogonal to the main shrinkage direction of the label. Further a specimen is produced by cutting a label into a rectangular shape, of which longer sides correspond to the orthogonal direction to the main shrinkage direction, and then slitting up the cut piece at the center of one of the longer sides from the end edge thereof, followed by measurement of Elmendorf tearing road (Elmendorf tearing road of the film base material except for a printing layer) in the main shrinkage direction of the label. Then an Elmendorf ratio is calculated by the following Equation 2.

$$\text{Elmendorf ratio} = \text{Elmendorf tear load in the main shrinkage direction(in the film width direction)} / \text{Elmendorf tear load in the direction orthogonal to the main shrinkage direction} \quad \text{Equation 2}$$

When the Elmendorf ratio of a label is less than 0.1, it is not preferable because it is hard to tear straight through along perforations, when perforations are provided. Conversely, when the Elmendorf ratio of a label is more than 2.0, it is not preferable because it tends to tear at a position out of perforations. The lower limit value of Elmendorf ratio is preferably 0.12 or more, more preferably 0.14 or more, and particularly preferably 0.16 or more. Further, the upper limit value of Elmendorf ratio of a film base material except for a printing layer of a label, is preferably 1.8 or less, more preferably 1.6 or less, and particularly preferably 1.5 or less.

Regarding a label of the present invention, a refractive index in the direction orthogonal to the main shrinkage direction (film longitudinal direction) of a label covered is preferably not less than 1.565 and not more than 1.610. When a refractive index in the direction orthogonal to the main shrinkage direction is more than 1.610, it is not preferable because solvent adhesiveness deteriorates. Reversely, when less than 1.565, it is not preferable because cutting property deteriorates. Additionally, the upper limit of a refractive index in the direction orthogonal to the main shrinkage direction is preferably not more than 1.605, and more preferably not more than 1.600. The lower limit of a refractive index in the direction orthogonal to the main shrinkage direction is preferably not less than 1.570, and more preferably not less than 1.575.

Dicarboxylic acid components constitute the polyester used in the present invention can include aromatic dicarboxylic acids such as terephthalic acid, isophthalic acid, naphthalenedicarboxylic acid and ortho-phthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage ratio.

Diol components constitute the polyester used in the present invention include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the heat-shrinkable polyester film preferably used as a label of the present invention, is preferably a polyester containing one kind or more of cyclic diols such as 1,4-cyclohexanedimethanol and diols having carbon 3 to 6 carbon atoms (for example, 1,3-propanediol, 1,4-butanediol, neopentyl glycol and hexanediol etc.) and adjusting a glass transition point (Tg) in 60 to 80° C.

Further, the polyester used for the heat-shrinkable polyester film preferably has 15% by mole or more of the sum of at least one monomer capable of forming an amorphous component in 100% by mole of the polyhydric alcohol component in the whole polyester resin, more preferably 17% by mole or more, and particularly preferably 20% by mole or more. Here, as a monomer capable of forming an amorphous component, for example, there can be listed neopentyl glycol, 1,4-cyclohexanedimethanol, isophthalic acid is preferably used.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage.

Further, in the polyester used in the heat-shrinkable polyester film of the present invention, it is preferable not to contain diethylene glycol, triethylene glycol and polyethylene glycol as far as possible. Particularly, since diethylene glycol is byproduct in the polymerization polyester, it generates easily in the polyester, but the content is preferably less than 4% of by mole.

In the heat-shrinkable polyester film, when it is treated for 10 seconds under no-load condition in hot water at 90° C., heat shrinkage in the width direction of the film (the main shrinkage direction) calculated from the following Equation 3 (namely, hot-water heat shrinkage at 90° C.) needs to be 40% or more and 80% or less from the lengths before and after shrinkage.

$$\text{Heat shrinkage} = \{(\text{length before shrinkage} - \text{length after shrinkage})/\text{length before shrinkage}\} \times 100 \; (\%) \quad \text{Equation 3}$$

When the hot-water heat shrinkage in the width direction at 90° C. is less than 40%, since the amount of shrinkage is small, it is not preferable because wrinkle and sag generate on a label after heat shrinkage, conversely, when the hot-water heat shrinkage in the width direction at 90° C. is more than 80%, when the film is used as a label, distortion in shrinkage is liable to be generated during heat shrinkage or so-called "jumping up" may be generated at heat shrinkage, and therefore the case is not preferred. The lower limit value of the hot-water heat shrinkage in the width direction at 90° C. is preferably 45% or more, more preferably 50% or more, and particularly preferably 55% or more. The upper limit value of the hot-water heat shrinkage in the width direction at 90° C. is preferably 75% or less, more preferably 70% or less, and particularly preferably 65% or less.

Further, in the heat-shrinkable polyester film preferably used in the present invention, when it is treated for 10 seconds under no-load condition in hot water at 90° C., from the lengths before and after shrinkage, heat shrinkage in the longitudinal direction (the direction orthogonal to the main shrinkage direction) of the film calculated from the foregoing Equation 3 (namely, hot-water heat shrinkage at 90° C.) needs to be 0% or more and 15% or less, and it is preferably 0% or more and 13% or less, more preferably 0% or more and 12% or less, further preferably 0% or more and 11% or less, and particularly preferably 0% or more and 9% or less.

When the hot-water heat shrinkage in the longitudinal direction at 90° C. is less than 0% (namely, shrinkage ratio is a negative value), it is not preferable because a good shrinkage appearance cannot be obtained when used as a label of a bottle, conversely, when the hot-water heat shrinkage in the longitudinal direction at 90° C. is more than 15%, it is not preferable because strain in shrinkage at heat shrinkage tends to occur when used as a label. The lower limit value of the hot-water heat shrinkage in the longitudinal direction at 90° C. is preferably 1% or more, more preferably 2% or more, and particularly preferably 3% or more.

Further, in the heat-shrinkable polyester film preferably used in the present invention, it is preferable that shrinkage stress in the width direction is 3 MPa or more and 20 MPa or less when heated at 90° C. In the case where shrinkage stress in the width direction when heated at 90° C. is less than 3 MPa, it is not preferable because a good shrinkage appearance cannot be obtained when used as a label of a bottle, conversely, in the case where shrinkage stress in the width direction when heated at 90° C. is more than 20 MPa, it is not preferable because strain in shrinkage at heat shrinkage tends to occur when used as a label. The lower limit value of the shrinkage stress in the width direction when heated at 90° C. is more preferably 4 MPa or more, further preferably 5 MPa or more, and particularly preferably 6 MPa or more. Further, the upper limit value of the shrinkage stress in the width direction when heated at 90° C. is more preferably 18 MPa or less, furthermore preferably 16 MPa or less, even more preferably 14 MPa or less, and particularly preferably 12 MPa or less.

The thickness of the heat-shrinkable polyester film preferably used in the present invention, is not particularly limited, but 5 to 200 μm is preferable as a heat-shrinkable film for a label, and 10 to 70 μm is more preferable.

In addition, the heat-shrinkable polyester film preferably used in the present invention, preferably has a haze value of 4.0% or more and 13.0% or less. When the haze value exceeds 13.0%, it is not preferable because transparency becomes bad, so that there is a probability that appearance becomes bad in a label production. Additionally, the haze value is more preferably 11.0% or less, and particularly preferably 9.0% or less. Further, the smaller the haze value, the better, but the lower limit is about 4.0% from considerations that a predetermined amount of a lubricant must be added to the film in order to provide slipperiness necessary for practical use or the like.

Furthermore, the heat-shrinkable polyester film preferably used in the present invention, preferably has solvent adhesive strength of 4 (N/15 mm) or more. When the solvent adhesive strength is less than 4 (N/15 mm), it is not preferable because it tends to peel from a solvent-bonded part after heat shrinkage of a label. The solvent adhesive strength is more preferably 6 (N/15 mm) or more, and particularly preferably 8 (N/15 mm) or more. Additionally, the higher the solvent adhesive strength, the better, but it is considered that the upper limit of the solvent adhesive strength is about 15 (N/15 mm) from performance of a film forming equipment.

In the heat-shrinkable polyester film preferably used in the present invention, it is preferable that dynamic friction coefficient (dynamic friction coefficient when the front surface and the rear surface of the heat-shrinkable polyester film are joined) is 0.1 or more and 0.55 or less. When the dynamic friction coefficient is less than 0.1, or more than 0.55, it is not preferable because processabilities in processing into a label become bad. The lower limit value of dynamic friction coefficient is more preferably 0.15 or more, and particularly preferably 0.2 or more. Further, the upper limit value of the dynamic friction coefficient is more preferably 0.50 or less, and particularly preferably 0.45 or less.

The heat-shrinkable polyester film preferably used in the present invention can be obtained as follows; the foregoing polyester raw material is melt-extruded by an extruder to form an undrawn film, and the undrawn film is biaxially drawn by a predetermined method shown below and heat-treated.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film after lengthwise drawing is quenched, and then heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming method to obtain a heat-shrinkable polyester film of the present invention is described in detail by considering the difference from the film forming method of the conventional heat-shrinkable polyester film.

[Film Forming Method of Heat-Shrinkable Polyester Film of the Present Invention]

As described above, generally, a heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable polyester film with good perforation-tear property and high productivity, and as a result, they have achieved the following knowledge.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

Then, the present inventors have reached a conclusion that in order to satisfy good perforation-tear property and finish properties after shrinkage simultaneously from the above-described knowledge, "molecules not contributed to shrinkage force while being oriented in the longitudinal direction" need to be present in a film. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable polyester film satisfying good perforation-tear property and finish properties after shrinkage at the same time.

(1) Control of lengthwise drawing condition
(2) Intermediate heat treatment after lengthwise drawing
(3) Natural cooling (shutoff of heating) between intermediate heat treatment and transverse drawing
(4) Forced cooling of film after natural cooling
(5) Control of transverse drawing condition Hereinafter, each means described above is described sequentially.

(1) Control of Lengthwise Drawing Condition

In the process for production of a film preferably used in the present invention by a lengthwise-transverse drawing method, it is preferable to conduct the lengthwise drawing in two steps for obtaining a film roll of the present invention. Namely, a substantially unoriented film is lengthwisely drawn (first drawing step) 2.2 times or more and 3.0 times or less at a temperature of Tg or more and Tg+30° C. or less, and then without cooling below Tg lengthwisely drawn 1.2 times or more and 1.5 times or less at a temperature of Tg+10° C. or more and Tg+40° C. or less (second drawing step), thereby preferably to be lengthwisely drawn 2.8 times or more and 4.5 times or less in the total lengthwise drawing ratio (namely, lengthwise drawing ratio in the first step×lengthwise drawing ratio in the second step), more preferably to be lengthwisely drawn 3.0 times or more and 4.3 times or less in the total lengthwise drawing ratio.

Further, in conducting lengthwise drawing in two steps as described above, it is preferable to control conditions of lengthwise drawing so that a refractive index in the longitudinal direction of the film after lengthwise drawing is in a range of 1.600 to 1.630, and heat shrinkage stress in the longitudinal direction of the film after lengthwise drawing is 10 MPa or less. By conducting the lengthwise drawing in such predetermined conditions, it becomes possible to control degree of orientation in the longitudinal and width directions of the film and degree of tension of molecule in the following intermediate heat treatment, transverse drawing and final heat treatment, from which perforation-tear property of the final film can be made good.

In conducting the lengthwise drawing as described above, when the total lengthwise drawing ratio becomes high, shrinkage ratio in the longitudinal direction tends to become high, but by drawing in the lengthwise direction in two steps as described above, it becomes possible to reduce drawing stress in the longitudinal direction, and to suppress shrinkage ratio in the longitudinal direction at a low level. Further, when the total lengthwise drawing ratio becomes high, stress in drawing in the width direction becomes high, there is a tendency that control of final shrinkage ratio in the transverse direction becomes difficult, but by drawing in two steps, it becomes possible to make drawing stress in the transverse direction small, and it becomes easy to control the shrinkage ratio in the transverse direction.

Furthermore, when the total lengthwise drawing ratio becomes high, right-angled tear strength becomes low, and tensile strength in the longitudinal direction becomes high. Further, by approximating the total lengthwise drawing ratio to the transverse drawing ratio, the Elmendorf ratio can be approximated to 1.0, so that perforation-tear property can be made good as a label. Furthermore, by drawing in the lengthwise direction in two steps, due to being capable of lowering drawing stress in the transverse direction, it becomes possible to increase the orientation of longitudinal direction, so that right-angled tear strength becomes further low, and tensile strength in the longitudinal direction becomes larger. Therefore, by drawing in the lengthwise direction in two steps and increasing the total lengthwise drawing ratio, it becomes possible to obtain a label with very good perforation-tear property.

On the other hand, when the total lengthwise drawing ratio exceeds 4.5 times, orientation in the longitudinal direction becomes high, and solvent adhesive strength becomes low, but by controlling the total lengthwise drawing ratio to be 4.5 times or less, it becomes possible to suppress the orientation in the width direction and keep solvent adhesive strength high. Further, when the total lengthwise drawing ratio exceeds 4.5 times, roughness of surface layer becomes small, so that dynamic friction coefficient becomes high, but by controlling the total lengthwise drawing ratio to be 4.5 times or less, it becomes possible to suppress a decrease in roughness of surface layer and keep dynamic friction coefficient low.

Further, by drawing in the lengthwise direction in two steps, drawing stress in the longitudinal direction becomes small, so that there is a tendency that irregularity of thickness in the longitudinal direction and irregularity of thickness in the width direction become large, but by increasing the total lengthwise drawing ratio, it is possible to reduce irregularity of thickness in the longitudinal direction, being accompanied by that, haze can also be reduced. In addition, by increasing the total lengthwise drawing ratio, it is possible to reduce irregularity of thickness in the width direction because stress in transverse drawing becomes high.

In addition, by increasing the total lengthwise drawing ratio, it is possible to increase orientation in the longitudinal direction, thus it is possible to improve slitting property in winding a film after biaxial drawing finally into a roll.

(2) Intermediate Heat Treatment after Lengthwise Drawing

As described above, in order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

Namely, in the production of the film by a lengthwise-transverse drawing method preferably used in the present invention, after an undrawn film is lengthwisely drawn, under a state that both edges in the width direction are held by clips in a tenter, it is necessary to conduct heat treatment (hereinafter called intermediate heat treatment) at a temperature of 130° C. or more and 190° C. or less for 1.0 second or more and 9.0 seconds or less. By conducting such intermediate heat treatment, it becomes possible that "molecules not contributed to shrinkage force while being oriented in the longitudinal direction" can be present in a film, from which it becomes possible to obtain a film in which perforation-tear property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following predetermined natural cooling, forced cooling and transverse drawing, it becomes possible to orient molecules to the width direction and exhibit shrinkage force in the width direction while maintaining "molecules not contributed to shrinkage force while being oriented in the longitudinal direction."

The lower limit of the temperature in intermediate heat treatment is preferably 140° C. or more, and more preferably 150° C. or more. Further, the upper limit of the temperature in intermediate heat treatment is preferably 180° C. or less, and more preferably 170° C. or less. On the other hand, the time of intermediate heat treatment needs to be suitably adjusted in a range of 1.0 second or more and 9.0 seconds or less according to the composition of raw materials, and it is preferably adjusted in 3.0 seconds or more and 7.0 seconds or less.

Further, in conducting the intermediate heat treatment as described above, it is preferable to adjust conditions of intermediate heat treatment such that a refractive index in the longitudinal direction of the film after intermediate heat treatment is in a range of 1.595 to 1.625, and heat shrinkage stress in the longitudinal direction of the film after intermediate heat treatment is 0.5 MPa or less. Furthermore, it is preferable to adjust conditions of intermediate heat treatment such that tensile break elongation in the longitudinal direction of the film after intermediate heat treatment is 100% or more and 170% or less. By conducting the intermediate heat treatment in such a predetermined condition, it becomes possible to control degree of orientation in the longitudinal and width directions of the film and degree of tension of molecule in transverse drawing and final heat treatment, from which perforation-tear property of the final film can be made good. When tensile break elongation in the longitudinal direction of the film after intermediate heat treatment is less than 100%, since the film is brittle, a transverse drawing characteristic is bad, and breakage tends to occur in transverse drawing. Conversely, when tensile break elongation in the longitudinal direction of the film after intermediate heat treatment is more than 170%, even by adjusting conditions of transverse drawing and final heat treatment, it becomes difficult to obtain a film with good perforation-tear property.

Furthermore, conducting the intermediate heat treatment as described above, it is preferable to adjust conditions of intermediate heat treatment such that right-angled tear strength in the longitudinal direction of the film after intermediate heat treatment is 260 N/mm or less. By conducting the intermediate heat treatment in such a predetermined condition, it becomes possible to suppress a sharp increase of right-angled tear strength in the longitudinal direction in transverse drawing, and it becomes possible to make perforation-tear property of the final film good.

As described above, by maintaining the treatment temperature at 130° C. or more in conducting the intermediate heat treatment, it becomes possible to reduce shrinkage force to the longitudinal direction, so that it becomes possible to greatly reduce shrinkage in the longitudinal direction. Further, when the temperature of intermediate heat treatment is set to 190° C. or more, unevenness of shrinkage ratio in the transverse direction becomes large, but by controlling the treatment temperature of intermediate heat treatment at 190° C. or less, it becomes possible to reduce the unevenness of shrinkage ratio in the transverse direction.

Further, by maintaining the treatment temperature at 130° C. or more, it becomes possible to increase orientation in the longitudinal direction, so that it becomes possible to keep right-angled tear strength low and also approximate the Elmendorf ratio to 1.0. Further, when the treatment temperature exceeds 190° C. in conducting the intermediate heat treatment, a film crystallizes, and tensile strength in the longitudinal direction deteriorates, but by controlling the temperature of intermediate heat treatment at 190° C. or less, it becomes possible to suppress crystallization of a film and keep tensile strength in the longitudinal direction high.

Further, when the treatment temperature exceeds 190° C. in conducting the intermediate heat treatment, the surface layer of the film crystallizes, and solvent adhesive strength becomes low, but by controlling the temperature of intermediate heat treatment at 190° C. or less, it becomes possible to suppress crystallization of the surface layer of the film and keep solvent adhesive strength high. In addition, by controlling the treatment temperature at 130° C. or more, it becomes possible to lower a friction coefficient by increasing the surface roughness of the surface layer suitably.

Furthermore, when the treatment temperature exceeds 190° C. in conducting the intermediate heat treatment, there is a tendency that irregularity of thickness in the longitudinal and irregularity of thickness in the width directions become large because irregularity of shrinkage generates in the film, but by controlling the temperature of intermediate heat treatment at 190° C. or less, it becomes possible to keep irregularity of thickness in the longitudinal direction low. In addition, when the treatment temperature exceeds 190° C. in conducting the intermediate heat treatment, the film crystallizes and there is a tendency that irregularity of thickness in the width direction becomes large due to variation of stress in transverse drawing, but by controlling the temperature of intermediate heat treatment at 190° C. or less, it becomes possible to suppress crystallization of the film and keep irregularity of thickness in the width direction low.

Further, when the treatment temperature exceeds 190° C. in conducting the intermediate heat treatment, slitting property of the film deteriorate in production or breakage of the film tends to occur due to generation of irregularity of shrinkage in the film, but by controlling the temperature of intermediate heat treatment at 190° C. or less, it becomes possible to suppress breakage of the film, and maintain good slitting property.

In addition, when the treatment temperature exceeds 190° C. in conducting the intermediate heat treatment, there is a tendency that haze of the film becomes high due to crystallization of the film, but by controlling the temperature of intermediate heat treatment at 190° C. or less, it becomes possible to suppress haze of the film low.

(3) Natural Cooling (Shutoff of Heating) Between Intermediate Heat Treatment and Transverse Drawing In production of a film by the lengthwise-transverse drawing method preferably used in the present invention, as described above, it is necessary to conduct intermediate heat treatment after lengthwise drawing, however, between the lengthwise drawing and intermediate heat treatment, the film needs to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage ratio in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method preferably used in the present invention, as described above, the film naturally cooled is not transversely drawn as it is, but it is necessary that a temperature of the film is quenched to be 80° C. or more and 120° C. or less. By conducting such quenching treatment, it becomes possible to obtain a film with good perforation-tear property as a label. The lower limit of the temperature of the film after quenching is preferably 85° C. or more, and more preferably 90° C. or more. Further, the upper limit of the temperature of the film after quenching is preferably 115° C. or less, and more preferably 110° C. or less.

As described above, in quenching a film, when the temperature of the film after quenching keeps exceeding 120° C., shrinkage ratio in the width direction of the film becomes low and shrinkage becomes insufficient as a label, but by controlling the temperature of the film after quenching at 120° C. or less, it becomes possible to maintain shrinkage ratio in the width direction of the film high.

Further, in quenching a film, when the temperature of the film after quenching keeps exceeding 120° C., there is a tendency that the film crystallizes and haze becomes high, tensile strength in the longitudinal direction is lowered and solvent adhesive strength is lowered, but by quenching a temperature of the film after cooling to be 120° C. or less, it becomes possible to keep haze low, and maintain tensile strength in the longitudinal direction and solvent adhesive strength high.

Further, in quenching a film, when the temperature of the film after keeps continues exceeding 120° C., stress of transverse drawing carried out after cooling becomes small, and irregularity of thickness in the width direction tends to become large, but by quenching a temperature of the film after cooling to be 120° C. or less, it becomes possible to increase the stress of transverse drawing carried out after cooling and to reduce the irregularity of thickness in the width direction.

In addition, in quenching a film, when the temperature of the film after quenching keeps exceeding 120° C., breakage of the film tends to occur due to crystallization of the film, but by quenching a temperature of the film after cooling to be 120° C. or less, it becomes possible to suppress the breakage of the film.

(5) Control of Transverse Drawing Condition

In production of a film by the lengthwise-transverse drawing method preferably used in the present invention, it is necessary to transversely drawing a film in a predetermined condition after lengthwise drawing, intermediate heat treatment and quenching. Namely, the transverse drawing needs to be carried out such that the ratio becomes 2.0 times or more and 6.0 times or less at 80° C. or more and 120° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment. The lower limit of the temperature of transverse drawing is preferably 85° C. or more, and more preferably 90° C. or more. The upper limit of the temperature of transverse drawing is preferably 115° C. or less, and more preferably 110° C. or less. On the other hand, the lower limit of transverse drawing ratio is preferably 2.5 times or more, and more preferably 3.0 times or more. Further, the upper limit of transverse drawing ratio is preferably 5.5 times or less, and more preferably 5.0 times or less.

As described above, in drawing in the transverse direction, in drawing in the transverse direction, when drawing temperature is increased, tensile strength in the longitudinal direction becomes large, and the Elmendorf ratio in the longitudinal direction is approximated to 1.0, right-angled tear strength is lowered, and perforation-tear property as a label become good.

Further, when drawing temperature exceeds 120° C., shrinkage ratio in the longitudinal direction and also shrinkage ratio in the width direction become low, but by controlling the drawing temperature at 120° C. or less, it becomes possible to suppress the shrinkage ratio in the longitudinal direction low and maintain the shrinkage ratio in the width direction high.

Furthermore, when drawing temperature in the transverse direction becomes high, orientation in the transverse direction becomes low, solvent adhesive strength becomes high and also it becomes possible to prevent pressure-crash of lubricant and keep a friction coefficient low. In addition, when drawing temperature in the transverse direction becomes high, haze of the film becomes low due to decrease of voids inside the film.

Further, when drawing temperature exceeds 120° C., there is a tendency that irregularity of thickness in the width direction becomes large, but by controlling the drawing temperature at 120° C. or less, it becomes possible to reduce the irregularity of thickness in the width direction.

On the other hand, when drawing temperature is less than 80° C., orientation in the width direction becomes too high, breakage tends to occur in transverse drawing, slitting property in winding a film after biaxial thawing finally into a roll become bad, but by controlling the drawing temperature at 80° C. or more, it becomes possible to reduce the breakage in transverse drawing and improve slitting property in winding a film.

[Influence of Interaction in Production Process on Film Properties]

In preferable production of a heat-shrinkable polyester film of the present invention, any one process of the lengthwise drawing step, the intermediate heat treatment step, the natural cooling step, the forced cooling step and the transverse drawing step cannot make film properties good, but it is considered that by conducting all of the lengthwise drawing step, the intermediate heat treatment step, the natural cooling step, the forced cooling step and the transverse drawing step in predetermined conditions, it becomes possible to make film properties very efficiently good. Further, among the film properties, the important properties such as Elmendorf ratio, right-angled tear strength in the longitudinal direction, tensile break strength in the longitudinal direction, irregularity of thickness in the width direction, dynamic friction coefficient and irregularity of thickness in the longitudinal direction greatly vary in the values depending on interactions of a plurality of specific steps each other.

Namely, in the heat-shrinkable polyester film of the present invention, right-angled tear strength in the longitudinal direction needs to be adjusted to 100 N/mm or more and 310 N/mm or less. Interaction between lengthwise drawing step and intermediate heat treatment step has very greatly influence on the right-angled tear strength in the longitudinal direction.

Further, in the heat-shrinkable polyester film preferably used in the present invention, tensile break strength in the longitudinal direction needs to be adjusted to 50 MPa or more and 300 MPa or less, and on the tensile break strength in the longitudinal direction, interaction of three steps of the lengthwise drawing step, the intermediate heat treatment step and the transverse drawing step has influence very largely.

In the heat-shrinkable polyester film preferably used in the present invention, Elmendorf ratio needs to be adjusted to 0.1 or more and 2.0 or less, and on the Elmendorf ratio, interaction between the lengthwise drawing step and the intermediate heat treatment step has influence very largely.

In the heat-shrinkable polyester film preferably used in the present invention, dynamic friction coefficient is preferably adjusted to 0.1 or more and 0.55 or less, and on the dynamic friction coefficient, interaction between the lengthwise drawing step and intermediate heat treatment step has influence very largely.

Therefore, in order to adjust right-angled tear strength in the longitudinal direction, tensile break strength, Elmendorf ratio and dynamic friction coefficient of the heat-shrinkable polyester film into the range of the present invention, while considering the above-described interaction of steps each other, delicate adjustment of conditions such as the above-described is required.

The label of the present invention is a package in which a label provided using the foregoing heat-shrinkable polyester film as a base material is covered at least on a part of the outer circumference and heat-shrunk, and as an object of the package, to start with PET bottles for beverage, various kinds of bottles and cans, plastic containers for confectionery or lunch bag etc., paper box and the like can be listed (hereinafter, these are collectively referred to as a packaging object). In general, in the case where a label using a heat-shrinkable polyester film as a base material is covered on the packaging object and heat-shrunk, the label is heat-shrunk by about 2 to 15% and closely attached on the package. Additionally, a label covered on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to overlap the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

EXAMPLES

Hereinafter, the present invention is described in more detail by Examples, but the present invention is by no means limited to aspects of the Examples, and it can be suitably modified in the range not departing from the scope of the present invention.

Evaluation methods of films are as follows.

[Heat Shrinkage (Hot-Water Heat Shrinkage)]

A film was cut into a square of 10 cm×10 cm, treated and heat-shrunk in no load state for 10 seconds in hot water at a predetermined temperature±0.5° C., and then the dimensions of the film in the lengthwise and transverse directions were measured, and heat shrinkage each was obtained according to the following Equation 3. The direction with the larger heat shrinkage was defined as a main shrinkage direction.

Heat shrinkage={(length before shrinkage−length after shrinkage)/length before shrinkage}×100 (%)     Equation 3

[Maximum Value of Heat Shrinkage Stress]

A film was cut into a size of a main shrinkage direction (width direction)×a direction orthogonal to the main shrinkage direction (longitudinal direction)=200 mm×15 mm. Thereafter, after a universal tensile tester STM-50 manufactured by Baldwin Corporation was adjusted to a temperature of 90° C., the cut film was set thereto, and a stress value in the main shrinkage direction when held for 10 seconds was measured.

[Right-Angled Tear Strength]

After a film was shrunk by 10% in the main shrinkage direction in hot water adjusted at 80° C., in accordance with JIS-K-7128, a specimen was produced by sampling in a shape shown in FIG. 1 (additionally, in sampling, longitudinal direction of the specimen was defined as the main shrinkage direction). Thereafter, both edges of the specimen were held by a universal tensile tester (Autograph manufactured by Shimadzu Corporation), the specimen was measured for strength at tensile break in a condition of tensile speed 200 mm/min, and the right-angled tear strength per unit thickness was calculated using the following Equation 1.

Right-angled tear strength=strength at tensile break/thickness     Equation 1

[Elmendorf Ratio]

A film was attached on a rectangular frame in a previously loosened state (both edges of the film are held by the frame), by immersing the film in hot water at 80° C. for about 5 seconds until the loosened film becomes a state of tension in the frame (until the sag is lost), the film was shrunk by 10% in the main shrinkage direction of the film (hereinafter called pre-shrinkage). Thereafter, in accordance with JIS-K-7128, the film was cut into a size of main shrinkage direction× orthogonal direction=75 mm×63 mm, a specimen was produced by providing a slit (cut) of 20 mm from the center of long edge (edge along the main shrinkage direction) to become orthogonal to this edge. Then, using the specimen produced, measurement of an Elmendorf tear load in the direction orthogonal to the main shrinkage direction was carried out. Further, in the same way as in the above-described method, after pre-shrinkage of a film in the main shrinkage direction, a specimen was produced by changing the main shrinkage direction of the film into the orthogonal direction, measurement of the Elmendorf tear load in the main shrinkage direction was carried out. Then, from the thus obtained Elmendorf tear loads in the main shrinkage direction and the direction orthogonal to the main shrinkage direction, an Elmendorf ratio was calculated using the following Equation 42.

Elmendorf ratio=Elmendorf tear load in the longitudinal direction/Elmendorf tear load in the width direction     Equation 42

[Haze]

In accordance with JIS-K-7136, haze was measured by using a haze meter (300 A, manufactured by Nippon Denshoku Industries Co., Ltd.). The measurement was carried out twice and the average was obtained.

[Solvent Adhesive Strength]

1,3-Dioxolan was applied on a film, and two pieces were bonded to seal. Thereafter, the seal part was cut into a width of 15 mm in the direction orthogonal to the main shrinkage direction of the film (hereinafter called orthogonal direction), which was set to a universal tensile tester STM-50 manufactured by Baldwin Corporation, and a 180° peel test was carried out in a condition of tensile speed 200 min/min. Then, the tensile strength at that time was defined as the solvent adhesive strength.

[Refractive Index]

Using an "Abbe refractometer 4 T type" manufactured by Atago Co., Ltd., a refractive index was measured after each sample film was left for two hours or more in an atmosphere at 23° C. and 65% RH.

The evaluation method of a label after covering is as follows.

[Measuring Method of Tensile Break Strength]

A label attached on an object to be packaged was peeled, in the case that the label was provided with printing, a printing layer was wiped out by a cloth soaked with ethyl acetate. A label not provided with printing or a label that a printing layer was removed was sampled, according to JIS-K-7127, into a rectangle test piece of 50 mm long in the direction orthogonal to the main shrinkage direction (film longitudinal direction) by 20 mm long in the main shrinkage direction (film width direction), using a universal tensile tester (Autograph manufactured by Shimadzu Corporation), both ends of the test piece (both ends in the long direction) were clamped, a tensile test was conducted under the condition of 200 mm/min in tensile speed, and a stress value at break was calculated as a tensile break strength.

[Measuring Method of Right-Angled Tear Strength]

A label attached on an object to be packaged was peeled, in the case that the label was provided with printing, a printing layer was wiped out by a cloth soaked with ethyl acetate. Using a label not provided with printing or a label that a printing layer was removed, according to JIS-K-7128, a specimen was produced by sampling in a shape shown in FIG. 1 (additionally, in sampling, longitudinal direction of the specimen was defined as the main shrinkage direction). Thereafter, both edges of the specimen were held by a universal tensile tester (Autograph manufactured by Shimadzu Corporation), the specimen was measured for strength at tensile break in the main shrinkage direction in a condition of tensile speed 200 mm/min, and the right-angled tear strength per unit thickness was calculated using the above Equation 1.

[Measuring Method of Elmendorf Ratio]

A label attached on an object to be packaged was peeled, in the case that the label was provided with printing, a printing layer was wiped out by a cloth soaked with ethyl acetate. A label not provided with printing or a label that a printing layer was removed, according to JIS-K-7128, was cut into a size of main shrinkage direction×direction orthogonal to the main shrinkage direction=37.5 mm×31.5 mm, a specimen was produced by providing a slit (cut) of 10 mm from the center of long edge along the main shrinkage direction to become orthogonal to this edge. Then, using the specimen produced, measurement of an Elmendorf tear load in the perforation direction (the direction orthogonal to the main shrinkage direction=longitudinal direction) was carried out. Further, a specimen was produced by changing the direction orthogonal to the main shrinkage direction of the film into the main shrinkage direction, measurement of the Elmendorf tear load in the direction orthogonal to the perforation direction (the main shrinkage direction=width direction) was carried out. Then, from the thus obtained Elmendorf tear loads in the main shrinkage direction and the direction orthogonal to the main shrinkage direction, an Elmendorf ratio was calculated using the above Equation 2.

[Refractive Index]

A label attached on an object to be packaged was peeled, and printing provided on the label surface was wiped out by a cloth soaked with a solvent (ethyl acetate, methyl ethyl ketone, etc.) for removal (when there is no printing, wiping work with a solvent is not necessary), after the label which became transparent resulting from removal of ink was left in the atmosphere of 65% RH for 2 hours or more, measurement was conducted using an "Abbe refractometer 4 T model" manufactured by ATAGO Co., Ltd. Additionally, a refractive index was measured by the above-described method.

[Opening Rate in Dropping]

Water (500 ml) was filled in an object to be packaged such as a PET bottle on which a label was attached, after the PET bottle was left in a refrigerator adjusted at about 5° C. for 8 hours or more, it was dropped from a height of 1 m in such a manner that the part provided with a perforation was downward, and the ratio (%) of one that the perforation was torn was calculated (n=100).

[Shrinkage Finish Property]

The evaluation of finish property of label attached around an object to be packaged was carried out visually, and the criteria were as follows.

Excellent: no wrinkle, jumping up and lack of shrinkage occurs, and no irregularity of color is observed.

Good: wrinkle, jumping up or lack of shrinkage cannot be observed, but some irregularity of color is observed.

Properties and compositions of polyester raw materials used in Examples and Comparative Examples and production conditions of films (drawing, heat treatment condition etc.) in Examples and Comparative Examples are shown in Table 1 and Table 2, respectively.

TABLE 1

| | Raw material composition of polyester (mol %) | | | | | |
|---|---|---|---|---|---|---|
| | Dicarboxylic acid component | Polyhydric alcohol component | | | | Added amount of lubricant |
| | DMT | EG | NPG | CHDM | BD | (ppm) |
| Polyester A | 100 | 100 | — | — | — | 8000 |
| Polyester A2 | 100 | 100 | — | — | — | 0 |
| Polyester B | 100 | 70 | 30 | — | — | 0 |
| Polyester C | 100 | 65 | — | 35 | — | 0 |
| Polyester D | 100 | — | — | — | 100 | 0 |

TABLE 2

| | | Drawing condition | | | | | | | | | |
|---|---|---|---|---|---|---|---|---|---|---|---|
| | | Lengthwise drawing | | | | Intermediate heat treatment (heat treatment after lengthwise drawing) | | Presence or absence of intermediate zone | | Transverse drawing step | | |
| | | First drawing step | | Second drawing | | | | | | | | Final heat treatment |
| | Resin composition | Temperature (° C.) | Ratio | Temperature (° C.) | Ratio | Total ratio | Temperature (° C.) | Time (sec) | | Temperature of cooling step | Temperature (° C.) | Ratio | temperature (° C.) |
| Example 1 | A/A2/B/D = 5:5:80:10 | 78 | 2.6 | 95 | 1.4 | 3.64 | 160 | 5 | Presence | 100 | 95 | 4 | 85 |
| Example 2 | A/A2/B/C/D = 5:5:15:65:10 | 78 | 2.6 | 95 | 1.4 | 3.64 | 160 | 5 | Presence | 100 | 95 | 4 | 85 |
| Example 3 | A/A2/C/D = 5:5:80:10 | 78 | 2.6 | 95 | 1.4 | 3.64 | 160 | 5 | Presence | 100 | 95 | 4 | 85 |
| Example 4 | A/A2/B/D = 5:5:80:10 | 78 | 2.9 | 95 | 1.4 | 4.06 | 170 | 8 | Presence | 100 | 95 | 4 | 85 |
| Example 5 | A2/B/D = 5:70:25 | 78 | 2.3 | 95 | 1.4 | 3.22 | 155 | 5 | Presence | 100 | 95 | 4 | 85 |
| Example 6 | A/A2/B/D = 30:5:55:10 | 78 | 2.2 | 95 | 1.34 | 2.94 | 155 | 5 | Presence | 100 | 95 | 4 | 85 |
| Comparative Example 1 | A/A2/B/D = 5:5:80:10 | — | — | — | — | — | — | — | Absence | — | 75 | 4 | 80 |

Fair: no jumping up and lack of shrinkage occurs, but irregularity of neck part is observed.

Poor: wrinkle, jumping up and lack of shrinkage occur.

[Label Adhesiveness]

When the label attached and an object to be packaged were lightly twisted, it was "good" in the case of no movement of label, and "poor" in the case of slide or out of alignment of the label and bottle.

[Perforation Operability]

Water (500 ml) was filled in an object to be packaged such as a PET bottle on which a label was attached, and then the PET bottle was cooled at 5° C. Thereafter, perforations of the label of the bottle immediately after taking it out from a refrigerator were torn with fingertips, and the number of bottles cleanly torn along the perforations in the lengthwise direction thereby to be able to remove the label from the bottle was counted, and a ratio (%) relative to the total samples of 50 was calculated.

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that glycol became 2.2 times to methyl ester in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto, polycondensation reaction was carried out at 280° C. under a reduced pressure of 26.6 Pa (0.2 ton). A polyester (A) of 0.70 dl/g in intrinsic viscosity was obtained. This polyester is polyethylene terephthalate. In the above-described production of polyester (A), $SiO_2$ (Silysia 266 manufactured by Fuji Silysia Chemical, Ltd.) was added as a lubricant at a proportion of 8,000 ppm relative to the polyester. Further, in the same way as described above, polyesters (A2, B, C, D) shown in Table 1 were synthesized. In the Table, NPG is neopentyl glycol, CHDM is 1,4-cyclohexanedimethanol, and BD is 1,4-butanediol. Regarding the intrinsic viscosity of each polyester, B was 0.72 dl/g, C was 0.80 dl/g and D was 1.15 dl/g. Each polyester was suitably made into chips.

Example 1

The above-described polyester A, polyester A2, polyester B and polyester D were mixed by 5:5:80:10 in weight ratio, and charged into an extruder. Thereafter, the mixed resin was melted at 280° C. and extruded from a T-die, and quenched by winding it on a rotating metal roll set at a surface temperature of 30° C. An undrawn film of 582 μm thickness was obtained. The taking-up speed of the undrawn film (rotary speed of metal roll) was about 20 m/min. Tg of the undrawn film was 67° C.

Then, the thus obtained undrawn film described above was introduced to a lengthwise drawing machine in which a plurality of rolls were continuously disposed, and drawn in the lengthwise direction in two steps by utilizing the difference of rotary speed of rolls. Namely, the undrawn film was preheated on a preheating roll until the film temperature became 78° C., and then drawn 2.6 times by utilizing the rotary speed difference between a low-speed rotary roll whose surface temperature was set at 78° C. and a medium-speed rotary roll whose surface temperature was set at 78° C. Furthermore, the lengthwisely drawn film was lengthwisely drawn 1.4 times by utilizing the rotary speed difference between a medium-speed rotary roll whose surface temperature was set at 95° C. and a high-speed rotary roll whose surface temperature was set at 30° C. (accordingly, the total lengthwise drawing ratio was 3.64 times).

The film immediately after the lengthwise drawing as described above was forcedly cooled at a cooling speed of 40° C./sec by a cooling roll (high-speed roll positioned just behind the lengthwise drawing roll in the second step) whose surface temperature was set at 30° C., and then the film after cooling was introduced to a tenter, and continuously passed through an intermediate heat treatment zone, a first intermediate zone (natural cooling zone), a cooling zone (forced cooling zone), a second intermediate zone, a transverse drawing zone and a final heat treatment zone. In the tenter, the length of the first intermediate zone was set to about 40 cm, and shielding plates were each provided between the intermediate heat treatment zone and the first intermediate zone; between the first intermediate zone and the cooling zone; between the cooling zone and the second intermediate zone; and between the second intermediate zone and the transverse drawing zone. Furthermore, in the first intermediate zone and the second intermediate zone, hot wind from the intermediate heat treatment zone, cooling wind from the cooling zone and hot wind from the transverse drawing zone were shut off such that when a rectangular strip of paper is hung down in the vertical direction in a state that a film is not passed through, the strip of paper hangs down almost completely in the vertical direction. In addition, when a film passes through, the distance of the film and the shielding plate was adjusted such that the most part of associated air accompanied by movement of the film was shut off by the shielding plate provided between the intermediate heat treatment zone and the first intermediate zone. In addition, when a film passes through, in the boundary between the intermediate heat treatment zone and the first intermediate zone, and the boundary between the cooling zone and the second intermediate zone, the distance of the film and the shielding plate was adjusted such that the most part of associated air accompanied by movement of the film was shut off by the shielding plate.

Then, the lengthwisely drawn film introduced to the tenter was heat-treated at first in the intermediate heat treatment zone at a temperature of 160° C. for 5.0 seconds, and then the film after the intermediate heat treatment was introduced to the first intermediate zone, and subjected to natural cooling by passing it through the zone (passing time=about 1.0 second). Thereafter, the film after the natural cooling was introduced to the cooling zone, and actively cooled by blowing wind of low temperature until the surface temperature of the film became 100° C., the film after the cooling was introduced to the second intermediate zone, and subjected to natural cooling again by passing it through the zone (passing time=about 1.0 second). Further, the film after passing through the second intermediate zone was introduced to the transverse drawing zone, preheated until the surface temperature of the film became 95° C., and drawn 4.0 times in the width direction (transverse direction) at 95° C.

Thereafter, the film after the transverse drawing was introduced to the final heat treatment zone, heat-treated in the final heat treatment zone at a temperature of 85° C. for 5.0 seconds, and then cooled, both edge parts were cut and removed for winding a roll of width 500 mm. A biaxially drawn film of about 40 μm in a predetermined length was produced continuously. Then, properties of the film obtained were evaluated by the foregoing methods. The evaluation results are shown in Table 3.

Example 2

The above-described polyester A, polyester A2, polyester B, polyester C and polyester D were mixed by 5:5:15:65:10 in weight ratio, and charged into an extruder. Thereafter, the mixed resin was melted and extruded in the same condition as in Example 1 to form an undrawn film. The undrawn film was film-formed in the same condition as in Example 1, and a biaxially drawn film of about 40 μm in 500 mm wide was produced continuously. Then, properties of the film obtained were evaluated by the same way as in Example 1. The evaluation results are shown in Table 3.

Example 3

The above-described polyester A, polyester A2, polyester C and polyester D were mixed by 5:5:80:10 in weight ratio, and charged into an extruder. Thereafter, the mixed resin was melted and extruded in the same condition as in Example 1 to form an undrawn film. The undrawn film was film-formed in the same condition as in Example 1. A biaxially drawn film of about 40 μm in 500 mm wide was produced continuously. Then, properties of the film obtained were evaluated by the same way as in Example 1. The evaluation results are shown in Table 3.

Example 4

An undrawn film was obtained in the same manner as in Example 1 except that film thickness was changed to 649.6 μm by adjusting the discharge amount in Example 1. A biaxially drawn film of about 40 μm in 500 mm wide was continuously produced by film-forming the undrawn film in the same condition as in Example 1 except that the lengthwise drawing ratio of the first step was 2.9 times (total lengthwise drawing ratio was 4.06 times), and heat treatment was conducted at 170° C. for 8.0 seconds in the intermediate heat treatment one. Then, properties of the film obtained were evaluated by the same way as in Example 1. The evaluation results are shown in Table 3.

Example 5

The polyester A2, polyester B and polyester D were mixed in a ratio of 5:70:25 and charged into an extruder. Thereafter, the discharge amount was changed from Example 1 to obtain an undrawn film of 515 μm in thickness. Then, a biaxially drawn film of about 40 μm was continuously produced in 500 mm width in the same way as Example 1 except that the first draw ratio upon lengthwise drawing was 2.3 times (total lengthwise draw ratio was 3.22 times), and heat treatment was conducted at a temperature of 155° C. in the intermediate heat treatment zone. The properties of the film obtained were evaluated by the same way as in Example 1. The evaluation results are shown in Table 3.

Example 6

The polyester A, polyester A2, polyester B and polyester D were mixed in a ratio of 30:5:55:10 and charged into an extruder. Thereafter, the discharge amount was changed from Example 1 to obtain an undrawn film of 470 μm in thickness. Then, a biaxially drawn film of about 40 μm was continuously produced in 500 mm width in the same way as Example 1 except that the first draw ratio upon lengthwise drawing was 2.2 times, the second draw ratio upon lengthwise drawing was 1.34 times (total lengthwise draw ratio was 2.94 times), and heat treatment was conducted at a temperature of 155° C. in the intermediate heat treatment zone. The properties of the film obtained were evaluated by the same way as in Example 1. The evaluation results are shown in Table 3.

Comparative Example 1

In melt extruding the same polyester raw material as Example 1 in the same way as Example 1, the discharge amount of the extruder was adjusted so that the thickness of an undrawn film was 160 μm. Except that, an undrawn film was obtained in the same way as Example 1. The undrawn film was not drawn in the longitudinal direction, after raising the film temperature to 90° C., the undrawn film was drawn at 75° C. by 4 times in the film width direction, thereby to continuously produce a mono-axial drawn film of about 40 μm in 500 mm width. The properties of the film obtained were evaluated by the same way as in Example 1. The evaluation results are shown in Table 3.

TABLE 3

Properties of heat-shrinkable film

| | Hot-water shrinkage (%) | | Right-angled tear strength (N/mm) | Elmendorf tear load (mN) | | | Tensile break strength (MPa) Orthogonal direction | Haze (%) | Solvent adhesive strength (N/15 mm) | Dynamic friction coefficient |
|---|---|---|---|---|---|---|---|---|---|---|
| | Main shrinkage direction | Orthogonal direction | | Main shrinkage direction | Orthogonal direction | Elmendorf ratio | | | | |
| | 80° C. | 90° C. | 90° C. | | | | | | | | |
| Example 1 | 41 | 57 | 7 | 240 | 260 | 310 | 0.84 | 220 | 7.5 | 5.5 | 0.43 |
| Example 2 | 42 | 59 | 6.5 | 240 | 260 | 310 | 0.84 | 215 | 7.5 | 5.9 | 0.41 |
| Example 3 | 40 | 60 | 6.5 | 235 | 260 | 300 | 0.87 | 210 | 7.5 | 6.1 | 0.41 |
| Example 4 | 40 | 57 | 12 | 180 | 260 | 250 | 1.04 | 270 | 8.5 | 4.9 | 0.43 |
| Example 5 | 44 | 55 | 6 | 200 | 250 | 320 | 0.78 | 150 | 11.1 | 6.5 | 0.39 |
| Example 6 | 40 | 57 | 8 | 280 | 270 | 310 | 0.87 | 280 | 12.6 | 4.1 | 0.45 |
| Comparative Example 1 | 44 | 56 | 5 | 420 | 200 | 8500 | 0.02 | 40 | 6 | 5.5 | 0.47 |

Properties of label

| | Right-angled tear strength (N/mm) | Tensile break strength (MPa) Orthogonal direction | Elmendorf ratio | Refractive Index in the direction orthogonal to the main shrinkage direction | Label adhesiveness | Shrinkage finish property | Opening rate in dropping (%) | Defective ratio of perforation opening (%) |
|---|---|---|---|---|---|---|---|---|
| Example 1 | 230 | 200 | 0.82 | 1.595 | Good | Good | 11 | 8 |
| Example 2 | 230 | 200 | 0.82 | 1.593 | Good | Good | 12 | 8 |
| Example 3 | 230 | 190 | 0.80 | 1.595 | Good | Good | 11 | 8 |
| Example 4 | 175 | 250 | 0.90 | 1.600 | Good | Good | 11 | 8 |
| Example 5 | 190 | 120 | 0.72 | 1.582 | Good | Good | 7 | 10 |
| Example 6 | 270 | 270 | 0.80 | 1.575 | Good | Good | 10 | 8 |
| Comparative Example 1 | 400 | 35 | 0.04 | 1.556 | Good | Good | 4 | 75 |

As is clear from Table 3, all the films obtained in Examples 1 to 6 had a high shrinkage in the width direction being the main shrinkage direction, and a very low shrinkage in the longitudinal direction orthogonal to the main shrinkage direction. For all the films obtained in Examples 1 to 6, solvent adhesion strength was high, label adhesiveness was good, there was no unevenness of shrinkage, and shrinkage finish was good. Further, for the heat-shrinkable polyester films of Examples 1 to 6, perforation openability was good and also no wrinkle was generated in the film roll produced. Regarding the package covered with the label composed of the heat-shrinkable polyester film obtained in each Example, perforation openability of the label was all good, and the label was able to be torn finely by an appropriate force along the perforation.

In contrast to that, regarding the package covered with the label composed of the heat-shrinkable polyester film obtained in Comparative Example 1, perforation openability of the label was not good, and the label was not able to be torn finely by an appropriate force along the perforation in a high rate.

INDUSTRIAL APPLICABILITY

The label of the present invention has excellent properties as described above, such that it can be used suitably as a package for all kinds of articles.

BRIEF DESCRIPTION OF THE DRAWINGS

FIG. 1 is an explanatory drawing showing a shape of specimen in measurement of right-angled tear strength (additionally, unit in length of each part of specimen in the FIGURE is mm).

EXPLANATION OF REFERENCE NUMERALS

F Film

The invention claimed is:

1. A label comprising a tubular body including a heat-shrinkable film as a base material thermally shrinking in the film width direction as the main shrinkage direction, being cut according to an object to be packaged and bonded at both edges in the film width direction, the tubular body being thermally shrunk so that at least part of the periphery of the object to be packaged is covered with the label, wherein a right-angle tear strength in the direction orthogonal to the main shrinkage direction (film longitudinal direction) is 100 N/mm to 310 N/mm, and a tensile break strength in the direction orthogonal to the main shrinkage direction (film longitudinal direction) is not less than 50 MPa and not more than 300 MPa.

2. The label of claim 1, wherein bonding is conducted with an organic solvent.

3. The label of claim 1, wherein an Elmendorf ratio is not less than 0.1 and not more than 2.0 in the case that an Elmendorf tear load in the direction orthogonal to the main shrinkage direction (film longitudinal direction) and an Elmendorf tear load in the main shrinkage direction are measured.

4. The label of claim 1, wherein a refractive index in the direction orthogonal to the main shrinkage direction (film longitudinal direction) is not less than 1.565 and not more than 1.610.

5. The label of claim 1, wherein a perforation or a notch is provided along the direction orthogonal to the main shrinkage direction (film longitudinal direction).

6. The label of claim 1, wherein the heat-shrinkable film is a heat-shrinkable polyester film.

* * * * *